April 17, 1962 HIROMU YAMASHITA ETAL 3,030,573
APPARATUS FOR MEASURING ELECTRIC RESISTANCE
OR CONCENTRATION OF LIQUID
Filed June 27, 1958
*Fig-1-*
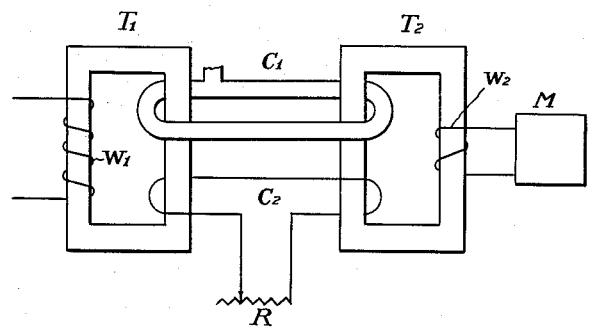
*Fig-2-*     *Fig-3-*
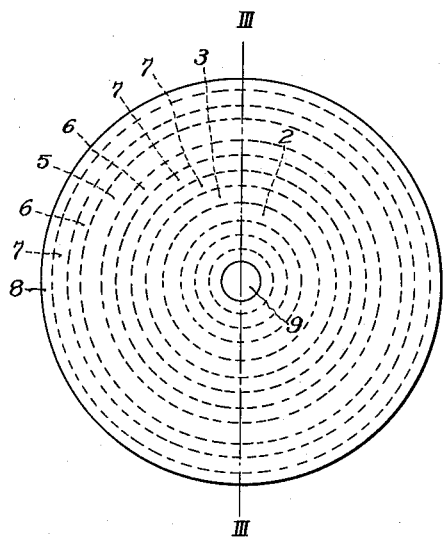 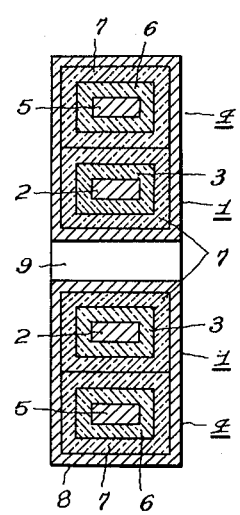

3,030,573
APPARATUS FOR MEASURING ELECTRIC RESISTANCE OR CONCENTRATION OF LIQUID

Hiromu Yamashita, Musashino-shi, Tokyo-to, and Akira Takahashi, Shinagawa-ku, Tokyo-to, Japan, assignors to Kabushiki Kaisha Denkishiki Kagakukeiki Kenkyusho, Toyko-to, Japan
Filed June 27, 1958, Ser. No. 745,157
Claims priority, application Japan Dec. 31, 1957
6 Claims. (Cl. 324—30)

The conventional apparatus of measuring electric resistance or concentration of a liquid has been constructed so that the electric resistance of the liquid to be measured may be measured by detecting the voltage drop in said liquid while passing an alternating electric current through said liquid by means of a pair of electrodes dipped in said liquid and so that the concentration of said liquid may be measured by compensating the change of the electric resistance of said liquid, caused by its temperature deviation. Accordingly, the conventional apparatus as described above is inevitably accompanied with errors due to polarization phenomenon of the surface of the dipped electrodes and the like.

It is an object of this invention to eliminate the above mentioned disadvantage.

Further objects and advantages of the present invention will become apparent and this invention will be more fully understood from the following description taken in connection with the accompanying drawing, in which:

FIG. 1 is a schematic view for describing the constructional theory of the apparatus of this invention.

FIG. 2 is a schematic front view of one embodiment of this invention.

FIG. 3 is a sectional view taken along the line III—III in FIG. 2.

Referring to FIG. 1, the apparatus comprises an exciting transformer $T_1$ provided with a primary winding $W_1$, a detecting transformer $T_2$ provided with a secondary winding $W_2$, a closed loop $C_1$ of pipe made of a nonconductive material, and a closed circuit $C_2$ constructed with a variable standard resistance R. The pipe $C_1$ and circuit $C_2$ are interlinked with the iron cores of the transformers $T_1$ and $T_2$ so that said pipe and circuit may act as the secondary windings of the transformer $T_1$ and as the primary windings of the transformer $T_2$, but said interlinkage of said pipe and circuit is made in reverse ampere turn each other on one side, for example, on the primary side of the transformer $T_2$, as shown in FIG. 1.

In the apparatus as shown in FIG. 1, when the liquid to be measured is filled in the closed loop $C_1$ and an alternating electric voltage is applied to the primary winding $W_1$ of the exciting transformer $T_1$, alternating electric currents, depending upon the electric resistance of the liquid coil formed in the closed loop $C_1$ and the electric resistance of the circuit $C_2$ will be, respectively, induced in said liquid coil and circuit $C_2$. Accordingly, two kinds of alternating magnetic fluxes, the directions of which are opposite to each other, are induced in the magnetic core of the detecting transformer $T_2$ by the action of said induced currents, thus resulting in production of an alternating voltage corresponding to the difference between said induced magnetic fluxes in the secondary winding $W_2$ of the transformer $T_2$. Accordingly, by supplying the voltage induced in the winding $W_2$ to an indicator M and by adjusting the variable resistance R so as to make indication of the indicator M zero, direct indication of the electric resistance of the liquid to be measured can be made possible, because when the indication of the indicator is zero, the resistance value of the resistance R is equal to the resistance of said liquid. In this case, the concentration of the liquid can also be measured by compensating the temperature effect of resistance of the liquid.

The present invention is based on the principle as described above. The apparatus illustrated in FIGS. 2 and 3 comprises an exciting transformer 1 provided with a toroidal primary winding 3 wound around a circular magnetic core 2, a detecting transformer 4 provided with a toroidal secondary winding 6 wound around a circular magnetic core 5, said transformer 4 being concentrically mounted around the exciting transformer 1, a winding 7 wound around the secondary side of the exciting transformer 1 as well as around the primary side of the detecting transformer 4, and a water proof casing 8 enclosing said transformers 1 and 4.

The apparatus in FIGS. 2 and 3 is actually combined with an alternating current source to be applied to the primary winding 3 of the exciting transformer 1, a detecting device such as an indicator and the like which is connected to the secondary winding 6 of the detecting transformer 4, and a variable standard resistor connected in series to the winding 7, but said members are omitted from the drawing, because they are understood very well from the apparatus in FIG. 1.

When resistance or concentration of a liquid is to be measured by the apparatus illustrated in FIGS. 2 and 3, the apparatus is dipped in said liquid filled in a suitable reservoir and the like. Then, the liquid will enter into the center bore 9 of the exciting transformer 1, so that the magnetic cores of the exciting and detecting transformers will interlink with said liquid so as to form electromagnetic coupling therebetween, thereby in the liquid to be measured and in the winding 7 are induced alternating electric currents whose magntiudes depend, respectively, upon their electric resistances.

Therefore, when the liquid and winding 7 are made to interlink with the exciting transformer or detecting transformer in reverse ampere turn relation, a pair of magnetic fluxes whose directions are in reverse relation will be induced in the magnetic core of the detecting transformer 4 depending upon the currents induced in the liquid and winding 7, thereby an output voltage corresponding to the difference of said fluxes will be induced in the secondary winding 6 of the transformer 4. Accordingly, if the resistance of the variable standard resistor connected to the winding 7 is adjusted so as to make said output voltage zero, the resistance value of the resistor at that time will indicate the resistance of the liquid to be measured. Further, as has been explained in connection with FIG. 1, the concentration of the liquid can be measured by compensating the temperature effect of the resistance of said liquid.

In embodying this invention, instead of manual adjustment of the standard variable resistor, this resistor may be automatically adjusted by means of a balancing motor or the like. If a balancing motor is used, the output voltage of the detecting transformer is amplified and then is supplied to one phase winding of said motor, and the sliding arm of the variable standard resistor is coupled with said motor so as to be slid along said resistor by the torque of said motor, the rotating direction of said motor being selected so as to make the output voltage of the detecting transformer zero, whereby the electric resistance of the liquid to be measured and the variable standard resistance are always brought in balanced state and the balancing motor is made to stop upon the establishment of said balance. Accordingly, such an apparatus as described just above is particularly suitable for carrying out a continuous measurement. In the above apparatus, if desired, it may be possible to provide electrostatic and electromagnetic shields between both the tansformers.

As will be clear from the above description, in the apparatus of this invention, the magnetic cores, liquid to be measured and circuit of variable standard resistor are made to be electromagnetically coupled by mere immersion of the apparatus in said liquid so that alternating currents may be induced in said liquid and circuit by electromagnetic induction and a detecting voltage as well as a standard voltage may also be derived by electromagnetic induction. Accordingly, in the apparatus of this invention, the following advantages will be obtained.

(a) There is no fear of causing measuring errors due to polarization phenomenon of the electrodes, which was inevitable in the prior devices.

(b) Since each of the exciting transformer and detecting transformer comprises a toroidal coil wound around a circular magnetic core, there is no leakage magnetc field and each coil is not affected by any external magnetic field, thus making it possible to arrange both the transformers in concentric relation so as to reduce the overall thickness.

(c) According to such construction as described above, the amount of the liquid entering into the center bore of the magnetic core is relatively small, thereby it is made possible to measure easily the resistance or concentration of the liquid of relatively high resistance. Moreover, length of the center bore of the magnetic core can be made very short, thereby cleaning of the inside of said bore can be easily carried out so that any conductive material may not adhesively remain in said bore, thus making it possible to avoid any measuring errors due to existence of said conductive material.

(d) Furthermore, since both the exciting transformer and detecting transformer are concentrically arranged each other, the measuring error due to a stray current passing through the liquid to be measured can be avoided by dipping the transformers in said liquid so that the center axes of the transformers may be perpendicular to the flowing direction of said stray current. Accordingly, even if any stray current passes through the liquid to be measured, said current does not affect the measurement.

As described above, this invention has many advantages and can be effectively used in practice.

While the present invention has been described in connection with a preferred embodiment, this invention is not limited thereto, but many changes and modifications may be made and we, therefore, contemplate by the appended claims to cover all such modifications as fall within the true spirit and scope of our invention.

What we claim:

1. Apparatus for measuring the conductivity of an electroconductive liquid comprising, an exciting transformer, a detecting transformer, means to apply alternating current as a primary input to said exciting transformer, means for receiving the electroconductive liquid whose conductivity is to be measured for interlinking the exciting and detecting transformers with said liquid forming a closed circuit coupling the exciting transformer and said detecting transformer, a closed loop circuit having an annular first winding forming a secondary winding on said exciting transformer and an annular second winding concentric with said first winding formed as a primary winding on said detecting transformer thereby coupling the exciting transformer and said detecting transformer and the windings thereof being arranged to induce flux in said detecting transformer in opposition to flux formed therein due to the presence of said liquid coupling said transformers upon application of exciting current to said exciting transformer, an output winding formed on the detecting transformer for developing a voltage therein by induction as a function of the difference between said opposition fluxes induced in the detecting transformer, a variable impedance element connected in said loop circuit to vary the value of the differential flux induced in said detecting transformer by said loop circuit when primary current is applied to the exciting transformer, the impedance element having sufficient resistance value to allow adjustment thereof to reduce the value of the voltage induced in said output winding to zero so that the adjusted resistance value necessary to cancel the differential flux in the detecting transformer is representative of the resistance of said liquid and the resistance of the liquid compensated for its conductivity temperature coefficient is representative of the concentration of the liquid.

2. Apparatus for measuring the conductivity of an electroconductive liquid according to claim 1, including means connected to said output winding of said detecting transformer for measuring and indicating the voltage output of said output winding, whereby variably adjusting said impedance to cancel said differential flux causes said measuring means to have a zero indication and the value adjustment in said impedance element to make said measuring means indicate a zero reading is representative of the conductivity of the liquid.

3. Apparatus for measuring the conductivity of an electroconductive liquid comprising, an exciting transformer, a detecting transformer, means to apply alternating current as a primary input to said exciting transformer, means for receiving the electroconductive liquid whose conductivity is to be measured for interlinking the exciting and detecting transformers with said liquid forming a closed circuit coupling the exciting transformer and said detecting transformer, a closed loop circuit having an annular first winding forming a secondary winding on said exciting transformer and an annular second winding coaxial with said first winding formed as a primary winding on said detecting transformer thereby coupling the exciting transformer and said detecting transformer and the windings thereof being arranged to induce flux in said detecting transformer in opposition to flux formed therein due to the presence of said liquid coupling said transformers upon application of exciting current to said exciting transformer, said transformers having concentric transformer cores on which said primary and secondary windings are formed respectively, an output winding formed on the detecting transformer for developing a voltage therein by induction as a function of the difference betwen said opposition fluxes induced in the detecting transformer, a variable impedance element connected in said loop circuit to vary the value of the differential flux induced in said detecting transformer by said loop circuit when primary current is applied to the exciting transformer, the impedance element having sufficient resistance value to allow adjustment thereof to reduce the value of the voltage induced in said output winding to zero so that the adjusted resistance value necessary to cancel the differential flux in the detecting transformer is representative of the resistance of said liquid and the resistance of the liquid compensated for its conductivity temperature coefficient is representative of the concentration of the liquid.

4. Apparatus for measuring the conductivity of an electroconductive liquid comprising, an exciting transformer, a detecting transformer, means to apply alternating current as a primary input to said exciting transformer, means for receiving the electroconductive liquid whose conductivity is to be measured for interlinking the exciting and detecting transformers with said liquid forming a closed circuit coupling the exciting transformer and said detecting transformer, a closed loop circuit having an annular first winding forming a secondary winding on said exciting transformer and an annular second winding coaxial with said first winding formed as a primary winding on said detecting transformer thereby coupling the exciting transformer and said detecting transformer and the windings thereof being arranged to induce flux in said detecting transformer in opposition to flux formed therein due to the presence of said liquid coupling said transformers upon application of exciting current to said exciting transformer, an output winding formed on the detecting transformer for developing a voltage thereinby induction as a function of the difference between said opposition fluxes induced in the detecting transformer, a variable impedance element connected in said loop circuit to vary the value of the differential flux induced in said detecting transformer by said loop circuit when primary current is applied to the exciting transformer, the impedance element having sufficient resistance value to allow adjustment thereof to reduce the value of the voltage induced in said output winding to zero so that the adjusted resistance value necessary to cancel the differential flux in the detecting transformer is representative of the resistance of said liquid and the resistance of the liquid compensated for its conductivity temperature coefficient is representative of the concentration of the liquid, and said means for receiving said electroconductive liquid having means for receiving said liquid concentrically with said windings.

5. Apparatus for measuring the conductivity of an electroconductive liquid comprising, an exciting transformer, a detecting transformer, means comprising a toroidal first winding to apply alternating current as a primary input to said exciting transformer, means for receiving the electroconductive liquid whose conductivity is to be measured for interlinking the exciting and detecting transformers with said liquid forming a closed circuit coupling the exciting transformer and said detecting transformer, a closed loop circuit having a toroidal second winding forming a secondary winding on said exciting transformer and a toroidal third winding concentric with said first and second windings formed as a primary winding on said detecting transformer thereby coupling the exciting transformer and said detecting transformer and the windings thereof being arranged to induce flux in said detecting transformer in opposition to flux formed therein due to the presence of said liquid coupling said transformers upon application of exciting current to said exciting transformer, an output toroidal winding formed on the detecting transformer concentric with said first, second and third windings, for developing a voltage therein by induction as a function of the difference between said opposition fluxes induced in the detecting transformer, a first annular magnetic core in said exciting transformer on which said first winding is developed, a second annular magnetic core concentric with said first core in which said detecting transformer output winding is developed, a variable impedance element connected in said loop circuit to vary the value of the differential flux induced in said detecting transformer by said loop circuit when primary current is applied to the exciting transformer, and the impedance element having sufficient resistance value to allow adjustment thereof to reduce the value of the voltage induced in said output winding to zero so that the adjusted resistance value necessary to cancel the differential flux in the detecting transformer is representative of the conductivity of said liquid.

6. Apparatus for measuring the conductivity of an electroconductive liquid comprising, an exciting transformer, a detecting transformer, means comprising a toroidal first winding to apply alternating current as a primary input to said exciting transformer, means for receiving the electroconductive liquid whose conductivity is to be measured for interlinking the exciting and detecting transformers with said liquid forming a closed circuit coupling the exciting transformer and said detecting transformer, a closed loop circuit having a toroidal second winding forming a secondary winding on said exciting transformer and a toroidal third winding concentric with said first and second windings formed as a primary winding on said detecting transformer thereby coupling the exciting transformer and said detecting transformer and the windings thereof being arranged to induce flux in said detecting transformer in opposition to flux formed therein due to the presence of said liquid coupling said transformers upon application of exciting current to said exciting transformer, an output toroidal winding formed on the detecting transformer concentric with said first, second and third windings for developing a voltage therein by induction as a function of the difference between said opposition fluxes induced in the detecting transformer, a first annular magnetic core in said exciting transformer on which said first winding is developed, a second annular magnetic core concentric with said first core on which said detecting transformer output winding is developed, a variable impedance element connected in said loop circuit to vary the value of the differential flux induced in said detecting transformer by said loop circuit when primary current is applied to the exciting transformer, the impedance element having sufficient resistance value to allow adjustment thereof to reduce the value of the voltage induced in said output winding to zero so that the adjusted resistance value necessary to cancel the differential flux in the detecting transformer is representative of the conductivity of said liquid and said means for receiving said electroconductive liquid having a central bore for receiving said liquid concentrically with said windings and centrally thereof and having a body cover portion covering said windings thereby to form a flat annular constriction.

References Cited in the file of this patent

UNITED STATES PATENTS

| | | |
|---|---|---|
| 2,542,057 | Relis | Feb. 20, 1951 |
| 2,709,785 | Fielden | May 31, 1955 |

FOREIGN PATENTS

| | | |
|---|---|---|
| 761,903 | Great Britain | Nov. 21, 1956 |

OTHER REFERENCES

Gupta et al.: Journal of Scientific Instruments, vol. 33, August 1956; pages 313 and 314.